(12) United States Patent
Liao et al.

(10) Patent No.: US 7,093,207 B1
(45) Date of Patent: Aug. 15, 2006

(54) DATA ANALYSIS FLOW ENGINE

(75) Inventors: Po-Shou Liao, Keelung (TW); Benny Huang, Jhonghe (TW); Charles Lai, Taipei (TW); Jimmy Liao, Erlin Township (TW); Bing Li, Fremont, CA (US); Ilya Languev, Fremont, CA (US); Peter Eldredge, Scotts Valley, CA (US); Leslie F. Smith, Puyallup, WA (US); Felix Lai, Jhongjheng District (TW); Sino Ho, Hsinchu (TW); Ellis E-Li Chang, Saratoga, CA (US); Sandeep Bhagwat, Milpitas, CA (US); Anthony Cheung, Milpitas, CA (US); Michael J. Bellon, Gilroy, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 430 days.

(21) Appl. No.: 10/715,082

(22) Filed: Nov. 17, 2003

(51) Int. Cl.
*G06F 17/50* (2006.01)
*G06F 12/00* (2006.01)
*G06F 19/00* (2006.01)

(52) U.S. Cl. .......................... 716/1; 707/203; 700/121

(58) Field of Classification Search ................ 716/1, 716/4; 700/121; 707/203–205
See application file for complete search history.

(56) References Cited

U.S. PATENT DOCUMENTS

| | | | |
|---|---|---|---|
| 6,286,104 B1 * | 9/2001 | Buhle et al. ............. | 726/4 |
| 2002/0002560 A1 * | 1/2002 | Shah et al. .............. | 707/200 |
| 2002/0095644 A1 * | 7/2002 | Weiss ..................... | 716/3 |
| 2002/0099796 A1 * | 7/2002 | Chou ...................... | 709/219 |
| 2003/0061212 A1 * | 3/2003 | Smith et al. ............. | 707/6 |
| 2003/0220768 A1 * | 11/2003 | Perry et al. ............. | 702/188 |
| 2004/0255024 A1 * | 12/2004 | Jones et al. ............. | 709/224 |
| 2005/0010546 A1 * | 1/2005 | Nowotny et al. ........ | 707/1 |

* cited by examiner

*Primary Examiner*—Stacy A Whitmore
(74) *Attorney, Agent, or Firm*—Luedeka, Neely & Graham, P.C.

(57) ABSTRACT

An extensible data analysis system for analyzing integrated circuit fabrication data produced during integrated circuit fabrication, including an application tier that selectively runs analysis nodes. The application tier has an architecture for optionally including and excluding a desired selection of the analysis nodes. The application tier architecture allows the selection of the analysis nodes to be dynamically added by a user. A data access tier selectively runs data reader nodes. The data access tier has an architecture for optionally including and excluding a desired selection of the data reader nodes. The data reader nodes interpret a desired variety of data source files containing the integrated circuit fabrication data having different formats for access by the application tier. The data access tier architecture allows the selection of the data reader nodes to be dynamically added by the user.

16 Claims, 10 Drawing Sheets

|  | Response Variable | |
|---|---|---|
|  | Continuous | Categorical |
| Input Variable — Continuous | scatterplot | Categorized cum prob plot, histogram |
| Input Variable — Categorical | Box plot, cum prob plot | Bivariate histogram, contingency table, mosaic plot |

DATA ANALYSIS FLOW ENGINE

FIELD

This invention relates to the field of integrated circuit fabrication. More particularly, this invention relates to analysis systems for the data developed during integrated circuit fabrication, testing, and inspection.

BACKGROUND

Integrated circuit fabrication is an enormously complex process, in which a wide range of materials, process, equipment, and know-how are brought together to form a product. Because the size of modern integrated circuits is so small, and because their design constraints are so tight, the devices themselves are easily impacted by any variations in the various factors listed above that are combined to produce them. Often, the impact on the integrated circuits is negative, costing the manufacturers millions of dollars in lost devices and productivity.

As integrated circuit fabrication costs continue to rise, yield management has become increasingly vital in helping manufacturers accelerate the ramp of new processes and technologies into production, in a manner where they can remain competitive and meet their profit margins. Finding defects and process errors during production is an important step in maximizing yield. Of equal importance, however, is finding the source of these yield problems so that corrective action can be taken quickly to optimize the processes. This is especially true for foundries, which implement many different processes and integrated circuit designs into production.

Yield management is typically implemented on computer based systems, on which an engineer can import data which they desire to investigate, and analyze the data using any one of a number of different routines that are provided by the yield management software. The results of those analysis procedures can be reported by whatever charting and display options are available in the yield management package.

Unfortunately, there are many drawbacks to currently available yield management systems. For example, yield management systems tend to have predefined capabilities, which either cannot be changed at all, or require additional development level work to change. Such rigidity can be seen in many aspects of the yield management system, such as in the analysis routines, the data input options, and the reporting options.

In regard to analysis, many integrated circuit manufacturers desire to use certain analysis procedures in their in their data analysis processes, which sets of analysis procedures tend to different from manufacturer to manufacturer. Thus, a single suite of analysis routines in a yield management system is insufficient. Further, some manufacturers desire to use customized and proprietary routines, which they do not wish to divulge to outside parties. Such routines cannot be added by the user to currently available yield management systems.

Similar limitations apply to the issue of data input. The integrated circuit fabrication process produces an enormous amount of data from an equally enormous number of different sources. Many of these data sources tend to have their own data storage architecture. Again, current yield management systems are insufficient in their ability to read all of the different data architectures that are available. Further, to build such "universal" ability into a yield management system would be cumbersome and awkward at best, and would be quickly outdated.

These limitations are also applicable to data reporting options. The number of different reporting options available, and the different preferences which exist from one manufacturer to another, tends to make it impossible to offer everyone the exact options that they desire in a traditional yield management system.

Thus, there are many shortcomings in the yield management systems that are currently offered. What is needed, therefore, is a yield management system with an architecture that reduces at least some of the problems with current yield management systems.

SUMMARY

The above and other needs are met by an extensible data analysis system for analyzing integrated circuit fabrication data produced during integrated circuit fabrication, including an application tier that selectively runs analysis nodes. The application tier has an architecture for optionally including and excluding a desired selection of the analysis nodes. The application tier architecture allows the selection of the analysis nodes to be dynamically added by a user. A data access tier selectively runs data reader nodes. The data access tier has an architecture for optionally including and excluding a desired selection of the data reader nodes. The data reader nodes interpret a desired variety of data source files containing the integrated circuit fabrication data having different formats for access by the application tier. The data access tier architecture allows the selection of the data reader nodes to be dynamically added by the user.

In this manner, the data analysis system is extensible, in that the user can decide which analysis nodes are to be included in the data flow through the system, and can also decide which data reader nodes are to be included in the data flow through the system. Thus, the user can include analysis nodes that are of benefit or interest, and exclude analysis nodes in which he has no interest. Further, the user can create customized and proprietary analysis nodes for inclusion in the data flow through the analysis system, and thus does not need to divulge such information to any third party. Additionally, the user can customize the data reader nodes that are used by the analysis system, so that the analysis system has the ability to read the format of the data files in which the user keeps the integrated circuit fabrication data. As before, only those data reader nodes that are desired need be included in the data flow. Additionally, the user is able to add customized or proprietary data reader nodes, so that such data formats may be read by the analysis system, without divulging the data formats or their use to third parties.

In various embodiments, at least a portion of the analysis nodes are proprietary nodes developed by the user. In other embodiments, at least a portion of the data reader nodes are proprietary nodes developed by the user. Preferably, a recipe navigator is used for choosing the desired selection of analysis nodes and for choosing the desired selection of data reader nodes. Preferably the desired selection of the analysis nodes and the desired selection of the data reader nodes are specified by a user defined recipe.

The nodes preferably implement all interfaces necessary for application within the extensible data analysis system. In some embodiments at least a portion of the nodes are interactive, and the extensible data analysis system presents an interface to display information to and receive information from the user when executing the interactive nodes, and at least a portion of the nodes are not interactive, and the non interactive nodes are executed by the extensible data analysis system without presenting information to and receiving information from the user. Preferably, the analysis nodes include nodes for at least one of partial least squares analysis, general discriminant analysis, classification and regression decision tree analysis, chi-square automated interaction detection decision tree analysis, general linear modeling analysis, and neural network analysis.

The application tier preferably runs data reporting nodes, and the application tier architecture optionally includes and excludes a desired selection of the data reporting nodes, where the application tier architecture allows the selection of the data reporting nodes to be dynamically added by the user. The data reporting nodes preferably include nodes for at least one of scatter plot, cumulative probability plot, histogram, box plot, bivariate histogram, contingency table, and mosaic plot.

In one preferred embodiment, a recipe navigator receives from the user the desired selection of the analysis nodes and the desired selection of the data reader nodes, and flows data from the data source files through the desired selection of the data reader nodes and the desired selection of the analysis nodes in a data flow. The recipe navigator preferably includes means for guiding the user through subsequent steps of the data flow, and preferably also includes means for allowing the user to selectively skip nodes in the data flow.

In one embodiment, association tables associate integrated circuit fabrication conditions with integrated circuit fabrication data trends. Preferably, a data versioning module creates new tables of integrated circuit fabrication data as required by a data flow, where the new tables of integrated circuit fabrication data only include data records that have been changed by the data flow. The data versioning module preferably dynamically joins changed data records with unchanged data records as needed by subsequent nodes in the data flow.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

The data analysis flow engine of the present invention is referred to herein as the ACE XP system. First, a description of some of the major components of the system is presented, and then discussions of several key aspects of the system are given.

Overview of the Data Analysis Flow Engine

Figure 1:
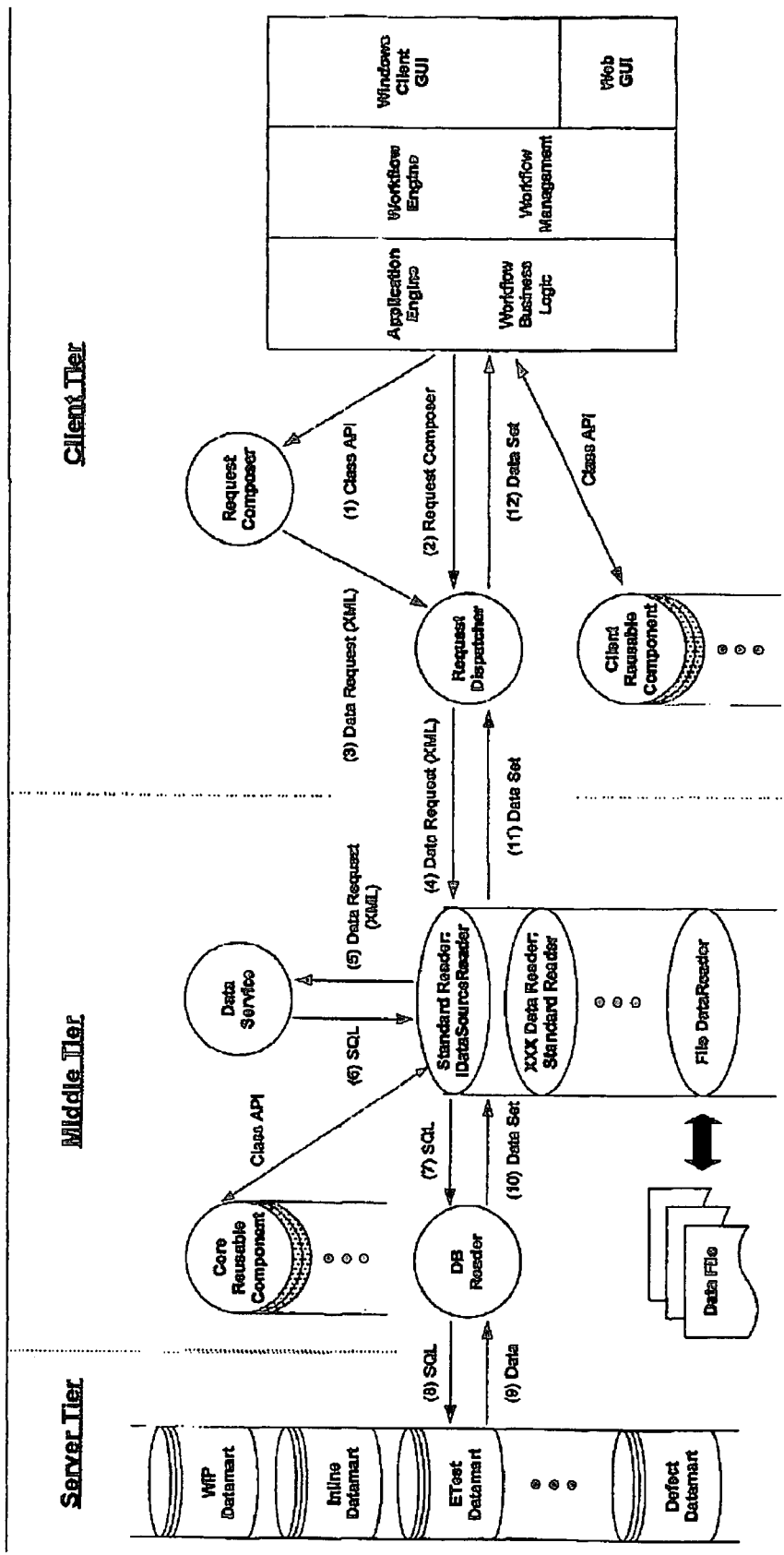
FIG. 1 is an overview of the data flow architecture analysis engine framework according to a preferred embodiment of the present invention.

The ACE XP system, as depicted in FIG. 1, preferably includes three tiers corresponding to the application or client tier, the data access or middle tier, and data source or server tier. The application tier preferably contains the data flow architecture engine utilizing plug in analysis components, client reusable components, which support user extendible data analysis, and includes the client links to the data access tier. The data access tier preferably utilizes plug in data reader components which provide user extendible data access. The data source tier preferably includes databases and file systems which are the source of the data to be analyzed. The data sources preferably include customer proprietary databases and file systems.

FIG. 1 demonstrates that multiple node types are preferably created by developing a node operation component as a class derived from base classes implementing all interfaces necessary for the system to apply an analysis node. This is the basis for the plug in analysis component in the ACE XP framework.

Figure 2:
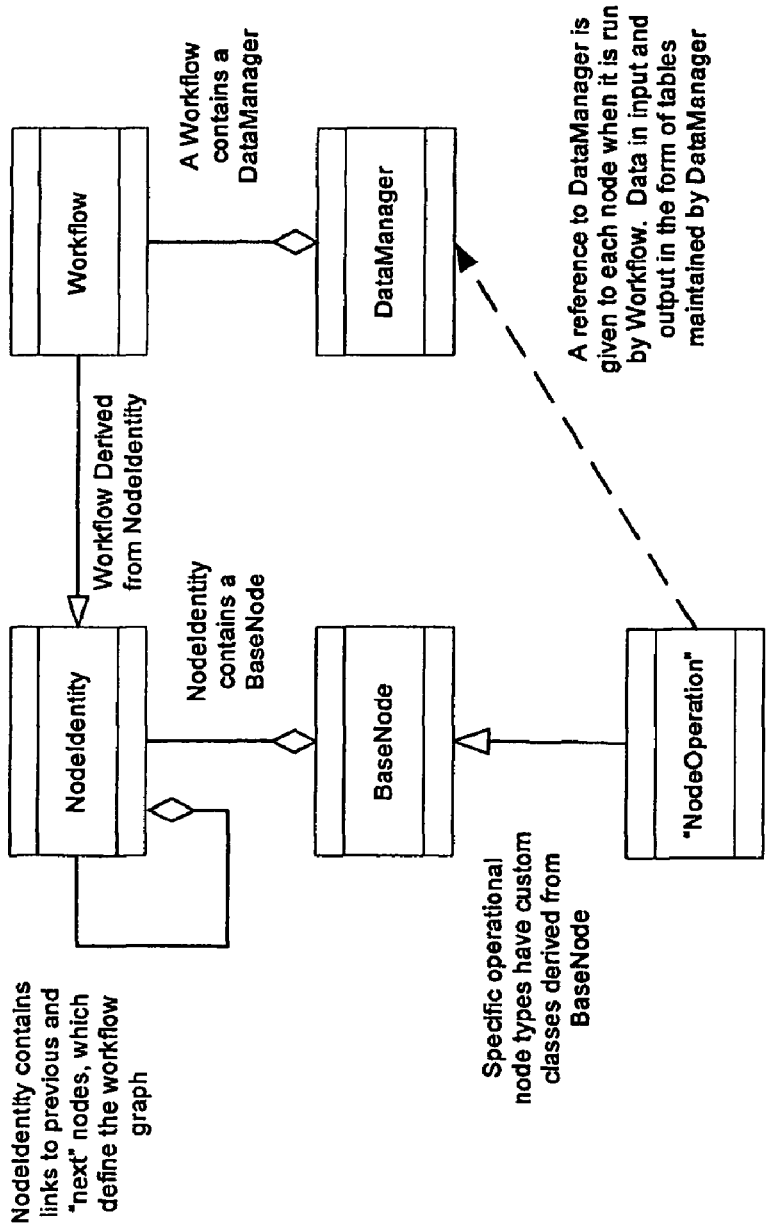
FIG. 2 depicts the analysis node structure of the data flow architecture analysis engine according to a preferred embodiment of the present invention.

FIG. 2 illustrates a preferred embodiment of the node operation, node setup and output display components and their relation to the workflow, work-area, and data manager components of the system. These three plug in component types preferably provide all the functionality, including customized setup and display of node results, that is required to fully integrate new functionality into the system.

An ACE XP workflow is preferably a collection of NodeIdentity objects. NodeIdentity objects are either workflow objects, or they contain a specialized NodeOperation class that derives from BaseNode and performs data manipulation, analysis, reporting, and so forth. The workflow objects preferably control the execution flow of the nodes they contain, while the NodeOperation objects preferably do the analysis or other work. The top level workflow object owns a DataManager object, which is the common data repository for the workflow.

The fundamental unit of an ACE XP workflow, which is preferably a recipe, is the node. All nodes are preferably instances of a base class, NodeIdentity, which implements the INodeIdentity interface. Through INodeIdentity, all parts of the system can preferably handle nodes without knowledge of the specific analysis or data manipulation function of the node. There are preferably two basic types of nodes, workflow nodes and operational nodes. Additionally, workflow nodes can be top level workflow nodes, or mega nodes, which are essentially sub workflows.

Preferably, only the NodeOperation is specific to the node type (filter node, statistical node, wafer map node, . . . , user defined node). This is the key to the plug in capability. Since the NodeOperation is preferably not visible to any component of the overall system, new node types are manipulated by the system in the same manner as all other nodes, and no component of the system needs to be recompiled or reinstalled for the system to use the new node type.

Figure 3:
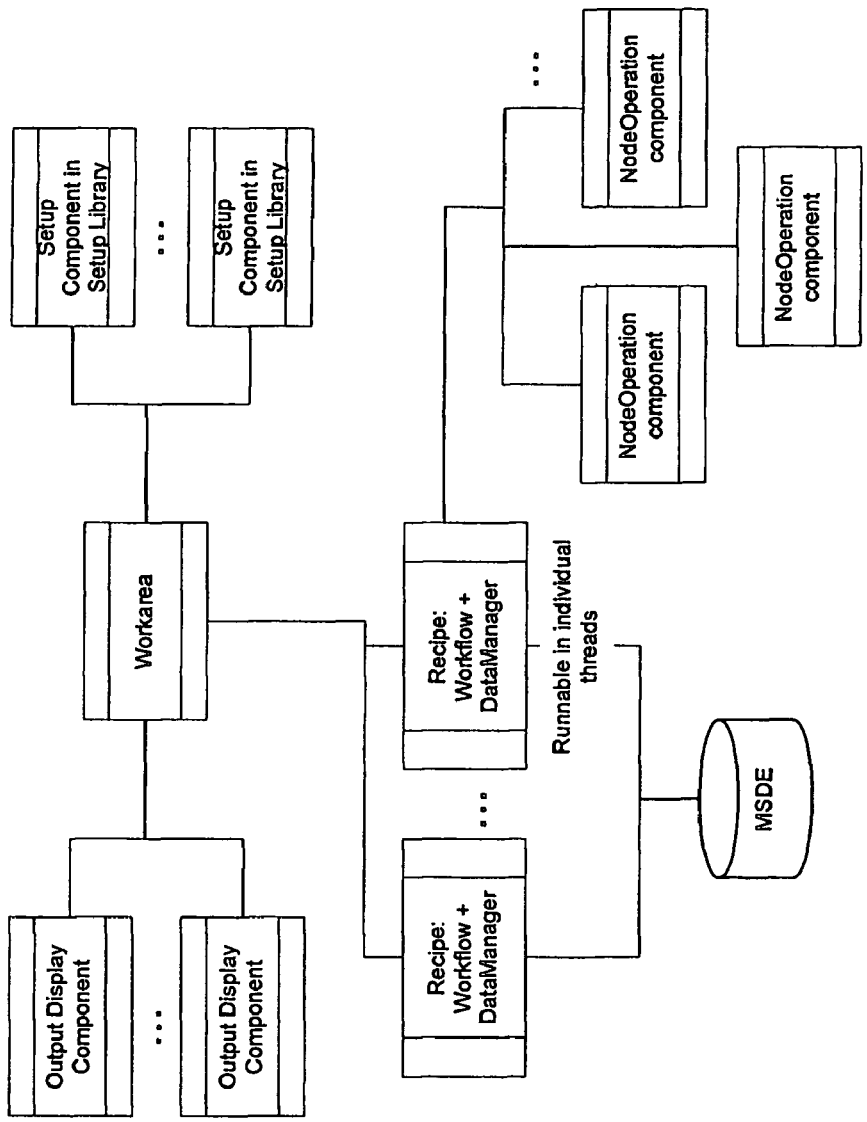
FIG. 3 depicts the component model of the data flow architecture analysis engine according to a preferred embodiment of the present invention.

ACE XP is componentized to support reuse, flexibility, and ease of maintenance. FIG. 3 is a diagram depicting the preferred major classes of components in the application tier of the program, and illustrates five categories of components that are preferably used to implement the recipe based, automated, data flow architecture style of analysis provided by the ACE XP system. These five categories are preferably the work area component, the workflow/DataManager component, the analysis component, the analysis setup component, and the output display component. Each of these is described in more detail below.

The work area component is preferably a .Net Windows form that may be reusable in other .Net applications. It provides the graphical display and editing of a single workflow. This component depends on other components in the ACE XP main graphical user interface, so its applicability may be limited to similar applications.

The workflow component is preferably a non user interface component that contains and executes a collection of nodes. It provides an interface to the work area that preferably allows the work area to manage the graphical presentation and editing of the workflow and the nodes it contains. The workflow is preferably also responsible for serializing/deserializing a recipe. A top level workflow (one per recipe) creates and owns a DataManager object. A reference to this DataManager is preferably supplied to each operational node (analysis component) in the recipe, and functions as the repository and manager of data written to it in table format by the operational nodes. The DataManager preferably loads the tables into a database created using Microsoft Data Engine.

The analysis components preferably implement a common interface that allows a workflow to execute them without knowledge of the specific analysis being performed. The interface preferably also allows the work area is to insert, delete, and copy analysis components.

The analysis setup component is preferably related to the analysis components through a graphical user interface display provided by the analysis component through its interface to the workflow or a client of the workflow. The client then uses the graphical user interface display to identify a graphical user interface component that can be used to setup the analysis.

Preferably, more than one graphical user interface may exist that is capable of setting up an analysis component. For example, in a web application, the graphical user interface may be an HTML page, while in the .NET application the graphical user interface is a Windows form component.

The system preferably uses four types of output display components. They are: (1) A spreadsheet component that displays tabular output, usually the ADO.Net tables that are the actual output of the analysis nodes; (2) A wafer map output component; (3) A chart output component; and (4) A report output component based on Crystal Reports, a product of Crystal Decisions, Inc. of Palo Alto Calif.

The output display components are preferably instantiated through a factory, which uses an XML configuration file to associate string names with .NET components. In this manner, the number and types of output display components can be increased as desired. Individual node operations specify the appropriate output display components to display their output, so users who develop custom nodes could also develop custom output display components to display their output. A software development kit is preferably used to assist users in this.

User Defined Functionality

The data flow architecture approach to user configurable analysis has been extended to allow analysis node types to be added to the system using late binding, which is an extension method that eliminates the need to recompile or reinstall the analysis system in order to add a new analysis node. This extension is described elsewhere herein. This creates an important opportunity to provide the analysis system's end users with support for creating new analysis nodes of their own. This allows them to integrate their own—sometimes proprietary—analysis nodes and removes the dependence on the original development team for extension of the system. The invention disclosed herein provides an efficient method of supporting end users who wish to take advantage of this capability.

The three major elements of the invention are preferably: (1) An ACE XP node project wizard, which is a Microsoft .NET enterprise template that generates a skeleton project with files providing all class definitions, including common interface methods, for the operation and setup components (such as graphical user interface) of an ACE XP node; (2) A set of pages for the .NET dynamic help system; and (3) An ACE XP node software development kit installation package User Created Interactive Applications The data flow architecture paradigm for the user configurable analysis of semiconductor process data allows users to create analysis flows by inserting analysis nodes into a flowchart like recipe. The paradigm has proven to be very effective in addressing many analysis use cases, but the form of the program is quite different from a user friendly program designed specifically for a particular use case. The generic nature of the nodes that is required if they are to be reused in many use cases does not lend itself to a use case specific user interface. In addition, it is common in special purpose software that some operations or functionality provided by the program are optional, and are exercised on demand when the user recognizes a need in a particular case.

The recipe navigator is a solution to this problem. It allows an advanced user of the system to create a recipe for a specific use case and customize the interaction of everyday users of the recipe with the setup and results user interface components for selected nodes. Nodes which are not selected for interaction are made invisible, in effect. Nodes which are selected can be presented to the user in context menus that identify available next steps in an analysis. The wizard like interface, used to provide selective navigation through the recipe or selected portions of the recipe, is much more aligned with effective user interface techniques than are commonly used in special purpose programs. Thus, the advantages of the data flow architecture paradigm are preserved—the high reusability of the analysis nodes and the high degree of customization of analysis achieved by combining nodes with generalized functionality. However, the disadvantages of an interface that is not specific to the use case, and the all or nothing nature of recipe execution are overcome.

The principle elements of the system are preferably: (1) A new capability provided to the recipe creator to tag nodes in a recipe according to their role in the daily use of the recipe. Some nodes are invisible to the daily user, others are preferably available for setup only (output is preferably not displayed, although results are written to the database for use by subsequent nodes), others may be tagged as interactive nodes whose output (charts, wafer maps, tables, and so forth) is preferably enabled for dynamic graphical data selection, which focuses subsequent nodes on the user selected data. Still others may be tagged as read only and their results are displayed, but are preferably not used in an interactive fashion; (2) A recipe navigator component that reads the recipe and the tags and provides the wizard like interface that allows the user to selectively execute parts of the recipe by selecting the breakpoint or next node to be viewed (nodes between the current node and the next node are executed invisibly to the user); (3) A context menu generator which preferably, at each break point, scans forward to subsequent tagged nodes and determines, based on the tag types and intervening conditional nodes, which should be presented as potential next nodes; and (4) A capability provided to the recipe creator to add descriptive information to tagged nodes which can be presented to daily users as explanation of the functionality.

Figure 4:
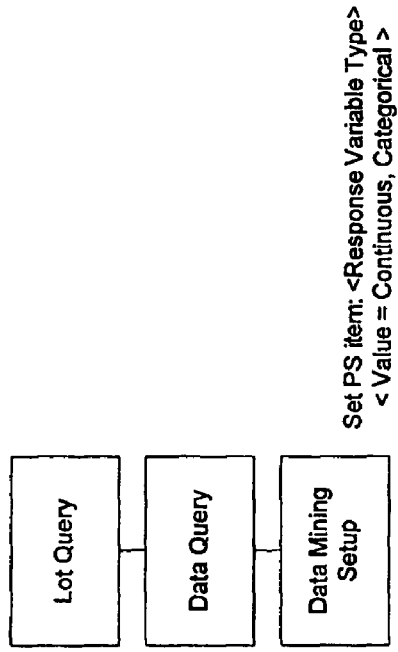
FIG. 4 depicts a first portion of the data mining recipe of the data flow architecture analysis engine according to a preferred embodiment of the present invention.
Figure 5:
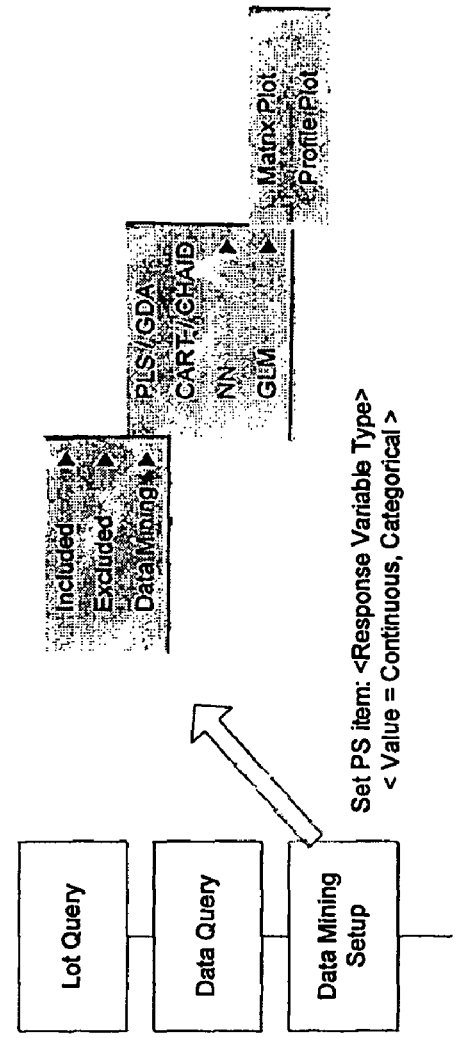
FIG. 5 depicts a destination menu of the data flow architecture analysis engine according to a preferred embodiment of the present invention.

A summary of a recipe navigator application to a sample data flow architecture recipe is now presented. The first portion of a data mining recipe might be as given in FIG. 4, which depicts a lot query node followed by a data query node and a data mining setup node. These three nodes are marked as "setup required," so that when the navigation reaches them it preferably launches their respective setup graphical user interfaces automatically. The user is preferably given no other navigation choices in this phase of recipe execution. However, when the data mining setup node is executed, the user preferably gets a menu of destinations, such as given in FIG. 5. The options are presented by the recipe navigator, such as in a graphical user interface as depicted in FIG. 6.

Figure 6:
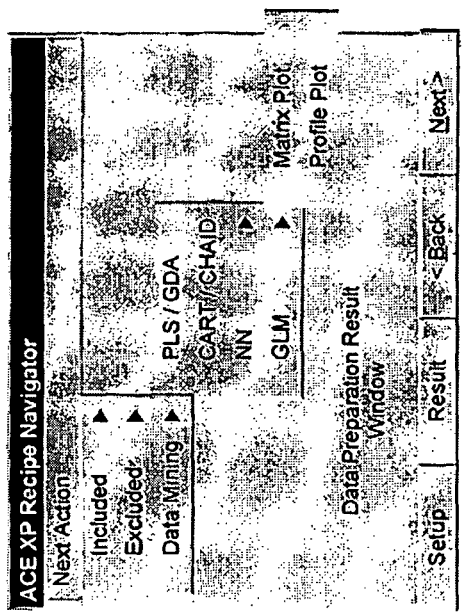
FIG. 6 depicts an options menu of the recipe navigator of the data flow architecture analysis engine according to a preferred embodiment of the present invention.
Figure 7:
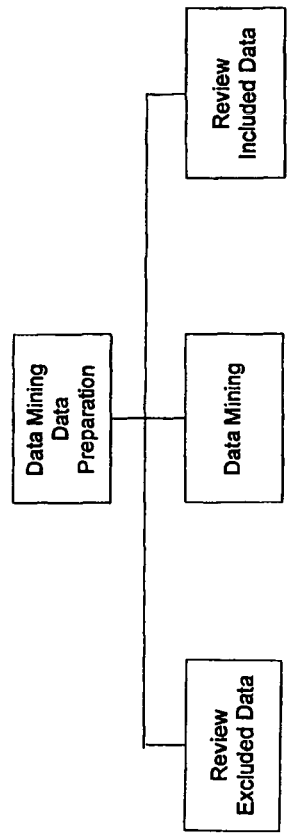
FIG. 7 depicts subsequent nodes in the recipe navigator of the data flow architecture analysis engine according to a preferred embodiment of the present invention.

The options on the menu of FIG. 6 preferably correspond to subsequent nodes. The top level of the menu suggests that there are three main branches to the recipe, as indeed there are in this sample implementation, as depicted in the flow chart of FIG. 7. Data preparation preferably executes without a graphical user interface. This operation reduces the number of parameters, removing some for specific reasons. It also preferably removes outlier values for parameters that are kept. The user is preferably able to review both data that is included and excluded from the final model. Nodes that do that (and which have subsequent nodes for particular viewing methods) are preferably included in the recipe, and the user may select them as destinations. The other main branch is the data mining itself, with many subsequent nodes that follow.

Figure 8:
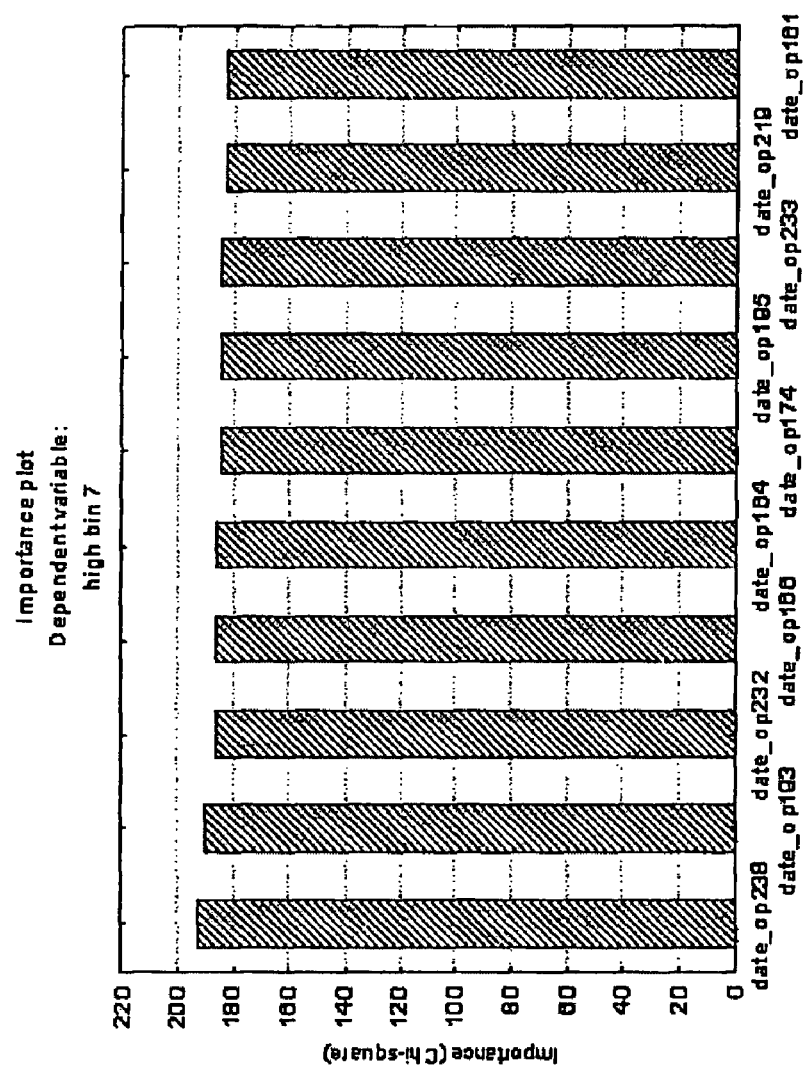
FIG. 8 depicts a data mining display chart of the data flow architecture analysis engine according to a preferred embodiment of the present invention.

Focusing for now on the option to review included data, FIG. 8 depicts a chart that displays the selected input variables with a ranking. The review included data node operates on a table preferably created by the data preparation node (written first as a file, then loaded back into ACE XP tables—the nodes that do this are not displayed in the example). The user is preferably able to select a bar in the chart of FIG. 8 and get a choice of visualizations of the data for the parameter. The choices are preferably a function of the type of the input and response variables, the matrix of which is given as an example in FIG. 9.

Figures 9, 10:
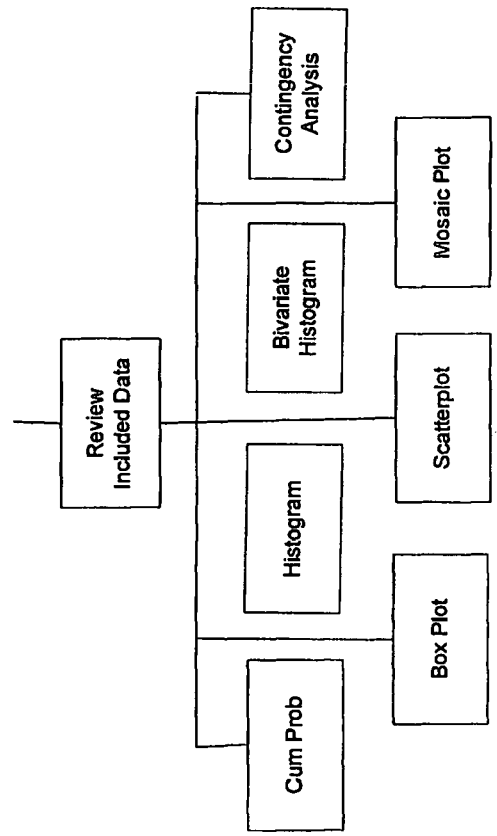
FIG. 9 depicts a chart of visualization options of the data flow architecture analysis engine according to a preferred embodiment of the present invention.
FIG. 10 depicts visualization option nodes depending from the review included data node of the data flow architecture analysis engine according to a preferred embodiment of the present invention.

From this example it can be seen that there are seven chart types, preferably including: scatter plot, cumulative probability plot, histogram, box plot, bivariate histogram, contingency table, and mosaic plot. These are preferably included as seven different nodes (possible with some invisible data preparation nodes in between) following the review included data node, as depicted in FIG. 10.

Preferably, only a few of these choices are available in any given case. The use of parse state items to save the response variable type and, when selected in the review included data node, the input variable type can preferably ensure that this is so. The individual analysis nodes are preferably configured to require one of several alternative combinations of parse state items, in this case the variable type items. The recipe navigator preferably uses this to filter out the destinations whose parse state requirements are not met.

Thus, if the response variable is continuous, then depending on the type of the graphically selected input variable, the destination choices may be scatter plot, or box plot and cumulative probability plot. Note that the categorized cumulative probability plot occurs in two cells of the matrix. It is available if either the response or input variable is categorical. The parse state requirements syntax should allow for multiple options to accommodate this. The previous option to review excluded data would most likely also have some optional visualization which would be provided in the same manner.

Figure 11:
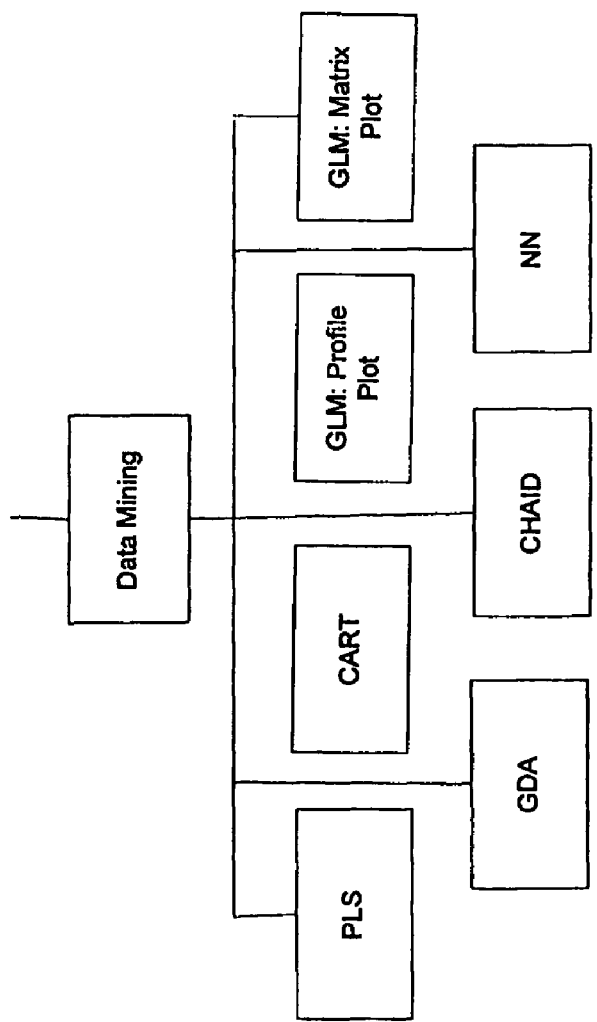
FIG. 11 depicts data analysis nodes depending from the data mining node of the data flow architecture analysis engine according to a preferred embodiment of the present invention.

The data mining option is preferably slightly different. Some of the alternative presentations of data mining results preferably depend only on the type of the response variable, which was preferably determined and written into the parse state at the data mining setup node. The several analysis types performed by data mining are as given in FIG. 11, and preferably include partial least squares, general discriminant analysis, classification and regression decision tree, and chi-square automated interaction detection decision tree, general linear modeling, and neural network, each of which preferably have their own methods of visualizing results.

Some of these methods are preferably available only for categorical response variables, and others only for continuous response variables. By setting parse state requirements on those nodes corresponding to the parse state item for response variable type, preferably only the applicable options appear in the menu provided by the recipe navigator. For the case of general linear modeling, two visualization types, profile plot and matrix plot, preferably require no user selection of input variables and therefore should be available as menu selections. They are therefore preferably selected directly from the menus provided at the data mining setup node.

Plug in Analysis Modules

The data flow architecture paradigm is significantly improved by allowing data flow architecture nodes to be dynamically added to the system. Dynamically added generally refers to late binding. The framework, and in particular an installed system, preferably need not be recompiled or reinstalled in order for the new nodes to be fully usable. In this manner, maintenance and extensions of the system by developers become much easier, and such operations by users themselves become possible.

The proposed approach fully solves the problem, allowing new nodes to be developed and fully integrated into a previously installed system. The elements of the solution are preferably the following: (1) reflection, provided by the .NET managed environment, allows text (XML) identification of available nodes, icons representing them (for the node palette), and their setup controls to be used to instantiate components using a node factory; (2) A common interface is defined which is preferably implemented by each node and setup control. The programmatic interaction between nodes and other components of the system is preferably limited to this interface so that the system requires no knowledge of unique characteristics of particular nodes; (3) A common method of storing and retrieving data in a standardized form is preferably supported by the system and used by all nodes and constitutes the means of communication between nodes, allowing them to work together to achieve a larger analysis objective than any single node is capable of achieving. This is the ACE XP data manager component.

User Defined Data Sources

Data analysis systems need to have access to data. This access is typically achieved by reading files and accessing databases that have a predefined format which the analysis system code is written to understand. However, the data types and sources in the semiconductor industry are highly varied, frequently changing, and sometimes proprietary to the users of the analysis system. This creates expensive and difficult to solve problems of data translation, duplication, flow, and integrity which limit the usability of the analysis system as a standard system for the industry.

The ACE XP system provides a solution to this problem. In essence, the method utilizes a feature developed to support plug in nodes in a data flow architecture analysis system, and provides a generalized means of reading almost any type of data from any source and storing it in the common form expected by analysis nodes. The solution is preferably layered, allowing adaptation to custom data sources with an appropriate level of effort.

The elements of the system are preferably the following: (1) A common interface defined for DataSourceReader classes, which allows customized DataSourceReader classes to be derived which access any specific data source, while preferably also allowing all other components of the analysis system to interact with any reader without having specific knowledge of its implementation of the data source it accesses; (2) A text (XML) identification of DataSourceReader objects which is preferably sufficient, given .NET reflection, to implement an object factory that can instantiate any DataSourceReader object; (3) An XML schema for files, and a corresponding database schema, that preferably identify the data items that can be retrieved from a given data source, and a set of items whose values can be used as selection criteria (filters) when retrieving a collection of data items from the source. This is called a data source specification; (4) A standard DataSourceReader that reads data from a database, using a specification (XML text, or values in a database) of parameterized structured query language queries, that preferably allows customized access to databases without the requirement of writing a new DataSourceReader. This is called a data source definition; and (5) The standard form of data used by all analysis nodes in the system. After the customized data access components (at the DataSourceReader or data source definition level) read data from the source, it is preferably stored within the analysis system in this standard form and can therefore be accessed by analysis nodes that have no knowledge of the source.

Together, these elements allow developers or end users to implement customized data access as part of a comprehensive data analysis system.

Figure 12:
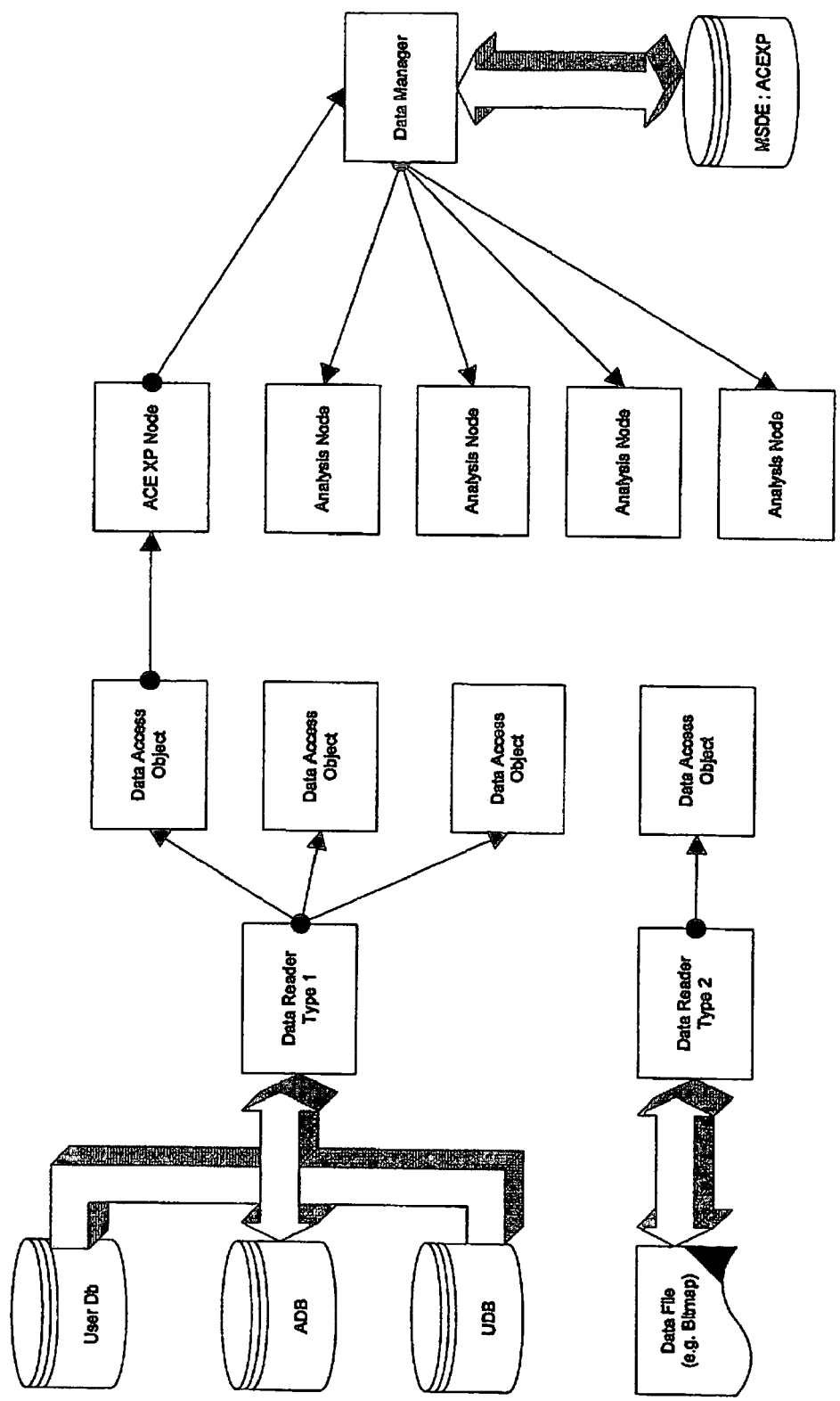
FIG. 12 depicts the multiple source data access system of the data flow architecture analysis engine according to a preferred embodiment of the present invention.

The data access system is depicted in FIG. 12 in the context of the overall ACE XP framework. FIG. 12 demonstrates that multiple data sources, including user defined data sources, are preferably integrated into the ACE XP framework using specialized data access objects.

Figure 13:
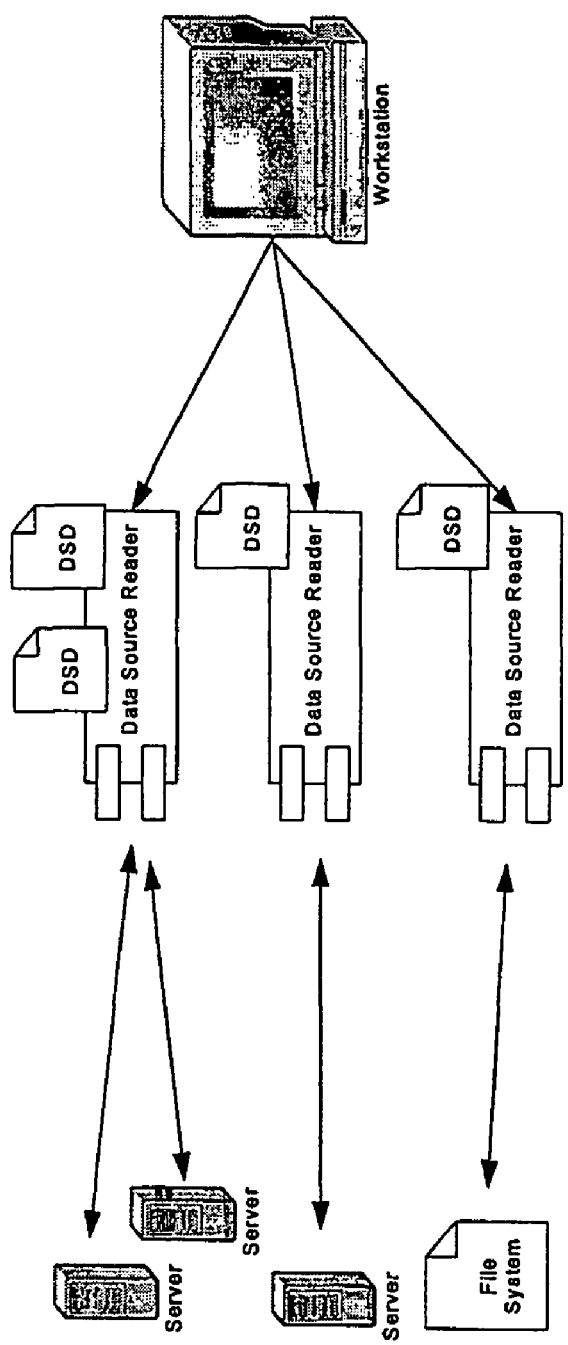
FIG. 13 depicts the objects that provide customized access to data sources of the data flow architecture analysis engine according to a preferred embodiment of the present invention.

FIG. 13 illustrates the roles of DataSourceReader objects, and DataSourceDefinition files which preferably provide customized, plug in access to any number of data sources. ACE XP preferably provides the user with access to data in the ACE XP database (ADB), the UDB, and customized access to other data sources, including the customer's proprietary data sources. This is preferably accomplished through a collection of customizable data source reader objects, which use XML data source descriptions that specify what data is available from which source, and how to query for and retrieve it.

Data from these sources is preferably loaded into tables maintained by a DataManager object, and can be accessed in a uniform way by all operation nodes within an analysis recipe. This allows the program to handle all of the required data types, from various sources, and makes analysis of the entire fabrication operation possible.

Capturing, Organizing, and Utilizing Knowledge

Effective analysis of complex semiconductor process data relies on accumulated end user knowledge of the process and the relations between different types of data about the process. For example, experienced process engineers may know that defects of a certain type are usually caused by one of several types of equipment used at particular steps in the process. As another example, experienced engineers know that certain final test bin codes—the various results of final electrical testing of the circuits on a wafer—correspond to particular failure modes of the circuit, and an experienced, engineer may well know that excessive numbers of failures of a certain type are most often caused by errors at one of a few process steps.

It is important that this sort of knowledge be shared between engineers, but the methods for doing so are limited. One common approach to knowledge sharing is the casebook method in which particular failure cases are described and the possible causes enumerated and explained. While this method can be effective, it has several drawbacks: it can be time consuming to search through a casebook to find a match to the current case, and the process cannot be automated—it requires a human engineer to perform the search in each case.

The parameter lookup association tables and the associated node in the ACE XP program, represents an advance in the technology of knowledge sharing and preservation. The specific form of knowledge that is preserved from automated application to analysis is an association of specific process parameters, inline, etest, sort, and sort parametric measurement results with other elements of the process—other parameters, process steps, process equipment, and so forth. In the examples cited above, particular defect types are known to be associated with particular process equipment, and particular bin codes are known to be associated with errors at particular process steps.

The invention preferably has two major elements: (1) A set of association tables that preferably relate measurement values or other parameters found in data of one type (such as defect data) with values or parameters of a different data type (such as process equipment found in work in progress data); and (2) An ACE XP parameter lookup node which can preferably be configured to read the names of process parameters of one data type, stored by prior nodes in tables in the ACE XP data manager, and then use the appropriate association table to lookup the names of parameters of a different data type. The input parameter names preferably vary from execution to execution of the recipe as the analysis identifies different problems in each case, say, high counts of bin 12 in one case, excessive numbers of bin 23 dies in another. The parameter lookup operation preferably points the subsequent analysis to specific data known to be related to the identified, problematic input parameters. For example, bin 12 is related to step 22, while bin 23 is related to step 15. After execution of the parameter lookup node, the subsequent analysis is automatically directed to analyze and report on the process step that has been identified with the current problem.

Effectual Multiple Data Set Versions

Data is often modified by an analysis system, such as by filtering, additions, or modifications of individual data items, but the modifications are preferably not permanent or irreversible. For example, computing the density of defects on a wafer uses the area of the wafer, and the number of defects. But the number of defects will change depending on whether or not certain defect types are filtered out of the defect list. If the user wants to successively filter out different types of defects and compute defect density in each case, then the system must be capable of reversing each filtering operation in turn. Similar considerations apply when an analysis module adds a column to a table, for example the computed defect densities just described might be stored as separate columns in a table of wafer data. Similarly, if specific data is modified, for example if a single defect density column is used to store the defect density calculated during each successive filtering of a defect type, then the values in that column need to change in each iteration. If, in order to preserve reversibility of data modifications, deletions, and additions, whole copies of large amounts of data are made, then the process can quickly exceed practical limits of memory. In addition, practical problems arise in regard to referring to the correct version of the data when multiple versions of the data are being maintained in memory.

The ACE XP system is a solution to these problems. It allows versioning of data with minimal data duplication, and tags the versions of data with an identifier associated with the analysis module that performs the modification.

The main elements of the invention are preferably the following: (1) Data is stored as a set of tables, which is preferably stored in a database as a set of ADO.NET tables. In ACE XP, the data is preferably stored in the Microsoft data engine database. Each row in the table preferably has a primary key to identify it uniquely; (2) Tables, and versions of tables are preferably associated with specific nodes that created them, identified with recipe unique integer node identifications and a table name; (3) When a node modifies a table, a new table is preferably created which contains the primary keys identifying the rows from the original table; (4) Additionally, the new table preferably contains columns of data that have been added to the new version; (5) Additionally, the new table preferably contains columns corresponding to columns in the previous table, if and only if some data in the column has been modified by the node creating the new table; and (6) When a version of a table is accessed by a subsequent, the data manager component, which preferably creates and manages all of the tables, preferably performs the necessary joins using the tables' primary key with previous versions of the table to obtain data contained in those previous versions which has not been modified in subsequent versions.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An extensible data analysis system for analyzing integrated circuit fabrication data produced during integrated circuit fabrication, comprising:
   an application tier for selectively running analysis nodes, the application tier having an architecture for optionally including and excluding a desired selection of the analysis nodes, where the application tier architecture allows the selection of the analysis nodes to be dynamically added by a user, and
   a data access tier for selectively running data reader nodes, the data access tier including an architecture for optionally including and excluding a desired selection of the data reader nodes, where the data reader nodes interpret a desired variety of data source files containing the integrated circuit fabrication data having different formats for access by the application tier, where the data access tier architecture allows the selection of the data reader nodes to be dynamically added by the user,
   wherein at least a portion of the nodes are interactive, and the extensible data analysis system presents an interface to display information to and receive information from the user when executing the interactive nodes, and at least a portion of the nodes are not interactive, and the non interactive nodes are executed by the extensible data analysis system without presenting information to and receiving information from the user.

2. An extensible data analysis system for analyzing integrated circuit fabrication data produced during integrated circuit fabrication, comprising:
   an application tier for selectively running analysis nodes, the application tier having an architecture for optionally including and excluding a desired selection of the analysis nodes, where the application tier architecture allows the selection of the analysis nodes to be dynamically added by a user, and
   a data access tier for selectively running data reader nodes, the data access tier including an architecture for optionally including and excluding a desired selection of the data reader nodes, where the data reader nodes interpret a desired variety of data source files containing the integrated circuit fabrication data having different formats for access by the application tier, where the data access tier architecture allows the selection of the data reader nodes to be dynamically added by the user, wherein the analysis nodes include nodes for at least one of partial least squares analysis, general discriminant analysis, classification and regression decision tree analysis, chi-square automated interaction detection decision tree analysis, general linear modeling analysis, and neural network analysis.

3. An extensible data analysis system for analyzing integrated circuit fabrication data produced during integrated circuit fabrication, comprising:

an application tier for selectively running analysis nodes, the application tier having and architecture for optionally including and excluding a desired selection of the analysis nodes, where the application tier architecture allows the selection of the analysis nodes to be dynamically added by a user, a data access tier for selectively running data reader nodes, the data access tier including an architecture for optionally including and excluding a desired selection of the data reader nodes, where the data reader nodes interpret a desired variety of data source files containing the integrated circuit fabrication data having different formats for access by the application tier, where the data access tier architecture allows the selection of the data reader nodes to be dynamically added by the user, and a recipe navigator for receiving from the user the desired selection of the analysis nodes and the desired selection of the data reader nodes, and flowing data from the data source files through the desired selection of the data reader nodes and the desired selection of the analysis nodes in a data flow.

4. The extensible data analysis system of claim 3, wherein at least a portion of the analysis nodes are proprietary nodes developed by the user.

5. The extensible data analysis system of claim 3, wherein at least a portion of the data reader nodes are proprietary nodes developed by the user.

6. The extensible data analysis system of claim 3, further comprising a recipe navigator for choosing the desired selection of analysis nodes.

7. The extensible data analysis system of claim 3, further comprising a recipe navigator for choosing the desired selection of data reader nodes.

8. The extensible data analysis system of claim 3, wherein the desired selection of the analysis nodes are specified by a user defined recipe.

9. The extensible data analysis system of claim 3, wherein the desired selection of the data reader nodes are specified by a user defined recipe.

10. The extensible data analysis system of claim 3, wherein the nodes implement all interfaces necessary for application within the extensible data analysis system.

11. The extensible data analysis system of claim 3, wherein the application tier further selectively runs data reporting nodes, the application tier architecture further for optionally including and excluding a desired selection of the data reporting nodes, where the application tier architecture allows the selection of the data reporting nodes to be dynamically added by the user.

12. The extensible data analysis system of claim 11, wherein the data reporting nodes include nodes for at least one of scatter plot, cumulative probability plot, histogram, box plot, bivariate histogram, contingency table, and mosaic plot.

13. The extensible data analysis system of claim 3, wherein the recipe navigator includes means for guiding the user through subsequent steps of the data flow.

14. The extensible data analysis system of claim 3, wherein the recipe navigator includes means for allowing the user to selectively skip nodes in the data flow.

15. The extensible data analysis system of claim 3, further comprising association tables for associating integrated circuit fabrication conditions with integrated circuit fabrication data trends.

16. An extensible data analysis system for analyzing integrated circuit fabrication data produced during integrated circuit fabrication, comprising:

an application tier for selectively running analysis nodes, the application tier having and architecture of optionally including and excluding a desired selection of the analysis nodes, where the application tier architecture allows the selection of the analysis nodes to be dynamically added by a user, and a data access tier for selectively running data reader nodes, the data access tier including an architecture for optionally including and excluding a desired selection of the data reader nodes, where the data reader nodes interpret a desired variety of data source files containing the integrated circuit fabrication data having different formats for access by the application tier, where the data access tier architecture allows the selection of the data reader nodes to be dynamically added by the user, and a data versioning module for creating new tables of integrated circuit fabrication data as required by a data flow, where the new tables of integrated circuit fabrication data only include data records that have been changed by the data flow, and the data versioning module dynamically joins changed data records with unchanged data records as needed by subsequent nodes in the data flow.

* * * * *